United States Patent
Higashi et al.

(10) Patent No.: US 7,820,252 B2
(45) Date of Patent: Oct. 26, 2010

(54) TRANSFLECTIVE FILM, TRANSFLECTIVE POLARIZER, AND POLARIZING LIGHT SOURCE DEVICE AND LIQUID CRYSTAL DISPLAY DEVICE USING THE SAME

(75) Inventors: Koji Higashi, Niihama (JP); Masaru Honda, Niihama (JP); Takuya Sairai, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/183,356

(22) Filed: Jun. 28, 2002

(65) Prior Publication Data
US 2003/0082314 A1    May 1, 2003

(30) Foreign Application Priority Data

Jul. 2, 2001   (JP)   ............................... 2001-200549
Jan. 22, 2002  (JP)   ............................... 2002-012612
Jan. 22, 2002  (JP)   ............................... 2002-012613

(51) Int. Cl.
    *G02F 1/1335*   (2006.01)
(52) U.S. Cl. ........................ 428/1.3; 428/1.31; 349/114; 349/96
(58) Field of Classification Search ................ 428/1.31, 428/1.5, 1.3; 359/487, 502, 569, 572, 589–590; 349/62, 67, 96–97, 114
See application file for complete search history.

(56) References Cited

U.S. PATENT DOCUMENTS

| | | | | |
|---|---|---|---|---|
| 2,660,925 A | * | 12/1953 | Turner | 359/359 |
| RE28,847 E | * | 6/1976 | Vizenor | 359/631 |
| 4,040,727 A | * | 8/1977 | Ketchpel | 349/114 |
| 4,432,852 A | * | 2/1984 | Fehlner et al. | 204/483 |
| 4,461,532 A | * | 7/1984 | Sato et al. | 359/359 |
| 4,501,471 A | * | 2/1985 | Culley et al. | 349/158 |
| 4,828,345 A | | 5/1989 | Kitamura et al. | |

(Continued)

FOREIGN PATENT DOCUMENTS

EP   0 843 195 A1   5/1998

(Continued)

OTHER PUBLICATIONS

JPO Website Machine English Translation of JP 2000-187106, Takahiro et al., Jul. 4, 2000.*

(Continued)

*Primary Examiner*—Sophie Hon
(74) *Attorney, Agent, or Firm*—Sughrue Mion, PLLC

(57) ABSTRACT

The present invention provides a transflective film comprising a polymer film having an in-plane phase retardation value of about 30 nm or less and a transflective layer made of an inorganic compound, wherein the transflective layer is coated on the polymer film and a reflectance of the transflective film is from about 10% to about 95%. When an absorption-type polarizer is laminated to the polymer film side of the transflective film, a transflective polarizer is provided. When a reflection-type polarizer is laminated to the transflective layer side of the transflective film, a transflective polarizer used in a system improving luminance is provided. Using these transflective polarizers, a polarizing light source device and a transflective liquid crystal display device are provided.

18 Claims, 7 Drawing Sheets

U.S. PATENT DOCUMENTS

| | | | | |
|---|---|---|---|---|
| 4,925,259 | A * | 5/1990 | Emmett | 359/359 |
| 5,309,169 | A * | 5/1994 | Lippert | 345/8 |
| 5,422,756 | A | 6/1995 | Weber | |
| 5,559,634 | A | 9/1996 | Weber | |
| 5,721,603 | A | 2/1998 | De Vaan et al. | |
| 5,738,918 | A * | 4/1998 | Shen et al. | 428/1.31 |
| 5,821,867 | A * | 10/1998 | Angell et al. | 340/815.45 |
| 5,828,488 | A | 10/1998 | Ouderkirk et al. | |
| 5,926,313 | A * | 7/1999 | Hishinuma et al. | 359/486 |
| 6,060,183 | A * | 5/2000 | Higashi et al. | 428/701 |
| 6,101,032 | A | 8/2000 | Wortman et al. | |
| 6,124,971 | A * | 9/2000 | Ouderkirk et al. | 359/487 |
| 6,231,992 | B1 * | 5/2001 | Niebauer et al. | 428/472 |
| 6,535,337 | B1 * | 3/2003 | Tanaka et al. | 359/599 |
| 6,538,714 | B1 * | 3/2003 | Sahouani et al. | 349/194 |
| 6,574,044 | B1 * | 6/2003 | Sahouani et al. | 359/498 |
| 6,590,711 | B1 * | 7/2003 | Gardner et al. | 359/599 |
| 6,813,094 | B2 * | 11/2004 | Kaminsky et al. | 359/707 |
| 7,110,178 | B2 * | 9/2006 | Trapani et al. | 359/492 |
| 2002/0080463 | A1 * | 6/2002 | Tonar et al. | 359/267 |
| 2003/0081151 | A1 | 5/2003 | Tsuchihashi et al. | |

FOREIGN PATENT DOCUMENTS

| | | | |
|---|---|---|---|
| JP | 7-181323 A | 7/1995 | |
| JP | 09-304617 A | 11/1997 | |
| JP | 10-073816 | 3/1998 | |
| JP | 11-190802 A | 7/1999 | |
| JP | 11-508376 T | 7/1999 | |
| JP | 11-271534 A | 10/1999 | |
| JP | 11-305040 A | 11/1999 | |
| JP | 2000-93272 | 4/2000 | |
| JP | 2000-187106 A | 7/2000 | |
| JP | 2000-235107 A | 8/2000 | |
| JP | 2001-116912 A | 4/2001 | |
| JP | 2001-174630 A | 6/2001 | |
| JP | 2001-228333 A | 8/2001 | |
| JP | 2001-282333 | 8/2001 | |
| JP | 2002-544565 T | 12/2002 | |
| JP | 2003-506728 T | 1/2003 | |
| WO | WO 97/01781 A2 | 1/1997 | |
| WO | WO 0046633 | 8/2000 | |
| WO | WO 00/70399 A1 | 11/2000 | |
| WO | WO 01/09227 A1 | 2/2001 | |

OTHER PUBLICATIONS

JPO Website Machine English Translation of JP 2001-174630, Koji et al., Jun. 29, 2001.*

JPO Website Machine English Translation of JP 2001-215333, Honda et al., Aug. 10, 2001.*

John M. Kusterer, "What Wavelength Goes with A Color?", Atmospheric Science Data Center, NASA Langley ASDC User Services, Sep. 28, 2007.*

JPO Website Machine English Translation of JP 2000-187106, Takahiro et al, Jul. 4, 2000.*

Physical Thickness and Optical Thickness, Tokai Optical Co., LTD, May 28, 2010.*

English translation of two Office Actions dated May 8, 2007 and Jun. 5, 2007 (7 pages total).

English Translation of Japanese Office Action dated Mar. 12, 2007 (4 pages).

* cited by examiner

TRANSFLECTIVE FILM, TRANSFLECTIVE POLARIZER, AND POLARIZING LIGHT SOURCE DEVICE AND LIQUID CRYSTAL DISPLAY DEVICE USING THE SAME

BACKGROUND OF THE INVENTION

1. Technical Field of the Invention

The present invention relates to a transflective liquid crystal display device in which a display screen is illuminated from back side in a dark place and a display screen is illuminated by utilizing ambient light in a light place, and a light source device and a member suitable for this.

More particularly, the present invention relates to a transflective film and a transflective polarizer, which can enhance utilization efficiency of light to make a screen brighter or can elongate the usable time of a battery, and a polarizing light source device and a transflective liquid crystal display device using them.

2. Description of the Related Art

Liquid crystal display devices are used in various fields since they are portable and light. A liquid crystal molecule in a liquid crystal display device is not a light emitting substance such as used in a cathode ray tube (CRT) and the like and only has a function as a light valve simply controlling polarization condition of light, therefore, a display screen of a liquid crystal display device is dark and invisible unless illuminated by some means. Namely, a reflective liquid crystal display device adopts a method by which ambient light is incorporated into a liquid crystal display device and a display screen is illuminated by this light.

However, in a reflective liquid crystal display device utilizing exclusively ambient light for illumination of a display screen, though excellent visibility is obtained outdoor under sunshine, since ambient light is weak in dark place such as night environment and the like, a display screen cannot be illuminated sufficiently to give a dark screen, decreasing visibility remarkably.

As a result, widely adopted are methods in which a liquid crystal display device is not of complete reflective mode and a display screen is illuminated using an auxiliary light source in a dark place, namely, is also of transmissive mode.

This dual function of reflection and transmission leads to the designation, "transflective". Therefore, a liquid crystal display device having dual mode of reflective mode and transmissive mode is called a transflective liquid crystal display device.

Here, a conventional transflective liquid crystal display device is described using FIG. 17. Generally, in a liquid crystal display device, by electrically changing the orientation condition of liquid crystal molecules enclosed in liquid crystal cell 30, the polarization condition of light passing through this is controlled, and the liquid crystal cell 30 is constituted of a pair of facing transparent electrodes, namely, a back side transparent electrode 31 and a front side transparent electrode 32, and a liquid crystal layer 33 sandwiched between them. Though omitted in the figure, the liquid crystal cell 30 also has, in addition to the above-mentioned components, cell substrates placed on both most outer surfaces, an orientated film for orienting the liquid crystal layer 33, and a color filter layer and the like in the case of color display.

At the front surface of the liquid crystal cell 30, an absorption-type polarizer 41 for detecting the polarization condition of light transmitting it is placed, and additionally, optical elements such as a phase retardar 42 and the like are also placed. On the other hand, on the back surface of the liquid crystal cell 30, a polarizing light source device 93 for extracting only specific polarized light and emitting it toward the liquid crystal cell 30 is placed, if necessary via a phase retarder (not shown in figure) at the back surface side. In the polarizing light source device 93, a transflective polarizer 92 comprising an absorption-type polarizer 90 and an optical film 91 having a transflective function is placed at a position facing the liquid crystal cell 30, further, on the back face side, a light source device 61 is placed. The light source device 61 comprises a light guide plate 52 having a light source 51 at the side or lower position, and a reflector 53 at the back of the light guide plate 52, and when the light source 51 is placed at the side position, light from this is reflected by a reflecting mirror 54, and substantially all of this is guided to the light guide plate 52, further, emitted toward the transflective polarizer 92. The transflective liquid crystal display device 94 is constituted as described above. Therefore, the conventional transflective polarizer 92 has a structure in which the absorption-type polarizer 90 and the optical film 91 having a transflective function are laminated, as shown in FIG. 18.

As the conventional optical film 91 having a transflective function used in such a transflective liquid crystal display device, there are known a film obtained by dispersing a light diffusing substance into a transparent or semi-transparent resin film as described for example in JP-A-55-46707, a film obtained by dispersing pearl luster pigments uniformly in a transparent substance and utilizing reflection at the surface of pearl luster pigments as described for example in JP-A-55-84975, and the like. These films had a problem that since a reflecting ability is manifested by back diffusing, the condensing effect of a lens sheet used for improving the front luminance of a transmissive liquid crystal display device is usually lowered, consequently, the front luminance is not improved.

On the other hand, in a transmissive liquid crystal display device, a system improving luminance using a reflection-type polarizer has recently been adopted as described, for example, in JP-A-63-168626, 6-51339 and 6-324333 and WO95/27919. In this system, by allowing a reflection-type polarizer to intervene between a light guide plate, which is a light source in a transmissive liquid crystal display device, and an absorption-type polarizer placed on a back surface side of a liquid crystal cell (hereinafter, referred to a back side absorption-type polarizer), one of the polarization component of light emitted from a light source or a light guide plate is reflected to return it to the light source or the light guide plate before being absorbed by the back side absorption-type polarizer, to cause polarization change or depolarization, consequently, light is recycled.

However, even if such a system improving luminance is tried to be applied to the conventional transflective liquid crystal display device, since the optical film 91 having a transflective function intervenes between the back side absorption-type polarizer 90 and the light source device 61 or the light guide plate 52 as shown in FIG. 17 in the conventional transflective liquid crystal display device, when a reflection-type polarizer is placed on the light source device 61 or the light guide plate 52, polarization condition is broken at the optical film 91 and a sufficient effect cannot be manifested.

SUMMARY OF THE INVENTION

An object of the present invention is to provide a transflective film or a transflective polarizer utilizable in a system improving luminance in a transflective liquid crystal display device, and by this, to provide a transflective liquid crystal display device which screen luminance can be enhanced or consumption power can be suppressed at the same screen luminance as conventional, or a light source device used for this. Another object of the present invention is to improve visibility under solar light by imparting slight reflection ability while applying a system improving luminance and mainly respecting use as a transmissive liquid crystal display device.

The present inventors have found that a transflective film utilizable in a system improving luminance can be provided by restricting the in-plane phase retardation value of a polymer film as a substrate to a value as described herein, and/or, by using an inorganic compound as the material of a transflective layer, further, by imparting a shape as described herein to the surface of a polymer film. Further, it has been found that a transflective polarizer which is utilizable in a system improving luminance can be provided by laminating this transflective film with an absorption-type polarizer. Furthermore, it has been found that even if in-plane phase retardation value is not restricted, a transflective polarizer obtained by laminating a polymer film having a transflective layer formed, a reflection-type polarizer, and an absorption-type polarizer in this order can itself attain a system improving luminance, and consequently, a high vision liquid crystal display device can be provided.

Namely, the present invention provides a transflective film comprising a polymer film having an in-plane phase retardation value of about 30 nm or less and a transflective layer made of an inorganic compound, wherein the transflective layer is coated on the polymer film and a reflectance of the transflective film is from about 10% to about 95%. Here, a rough surface may be formed on at least one surface of the polymer film, and in this case, it is advantageous to coat a transflective layer on this rough surface to give the transflective film of the present invention.

By laminating an absorption-type polarizer on this transflective film, a transflective polarizer utilizable in a system improving luminance can be produced. Hereinafter this film is referred to a transflective polarizer (1). Further, by laminating the reflection-type polarizer on the opposite side to the absorption-type polarizer so that the reflection-type polarizer faces the transflective film, a transflective polarizer utilizable itself in a system improving luminance can be obtained. Hereinafter this film is referred to a transflective polarizer (2).

The present invention provides a transflective polarizer obtained by laminating a polymer film having one surface on which a transflective layer made of an inorganic compound is formed, a reflection-type polarizer, and an absorption-type polarizer in this order. Hereinafter this film is referred to a transflective polarizer (3). This transflective polarizer (3) is itself utilizable in a system improving luminance.

The present invention provides a transflective polarizer obtained by laminating a polymer film formed an irregular shape on at least one surface thereof and a transflective layer made of a metal or inorganic compound on the irregular shape, a reflection-type polarizer and an absorption-type polarizer, wherein the polymer film, the reflection-type polarizer and the absorption-type polarizer are laminated in this order. Hereinafter this film is referred to a transflective polarizer (4). This transflective polarizer (4) is itself utilizable in a system improving luminance.

In any of the transflective polarizers (1) to (4) of the present invention, at least one light diffusing layer may be laminated to any position on the same optical path. The light diffusing layer preferably has an in-plane phase retardation value of about 30 nm or less.

In any of the transflective polarizer (1) to (4) of the present invention, it is preferable that at least one pair of adjacent films or layers are closely laminated using a pressure-sensitive adhesive, for the purpose of making handling easy and preventing unnecessary reflection by the interface with air. Therefore, in the case of lamination of a light diffusing layer to give the transflective film of the present invention, it is convenient in integrated lamination that the light diffusing layer has adhesive property.

In addition, the present invention provides a polarizing light source device comprising any of the transflective polarizers (1) to (4) of the present invention, a light source member and a reflector, wherein the light source member and reflector are placed in this order on the polymer film side of the transflective polarizer.

Further, the present invention provides a transflective liquid crystal display device comprising the polarizing light source device of the present invention, a liquid crystal cell and an absorption-type polarizer placed on a front surface side of the liquid crystal cell (hereinafter, referred to a front side absorption-type polarizer), wherein the liquid crystal cell and an front side absorption-type polarizer are placed in this order on the transflective polarizer side of the polarizing light source device. Here, a light diffusing layer may be laminated between the liquid crystal cell and the front side absorption-type polarizer. Further, it is preferable that at least one pair of members from the transflective polarizer to the front side absorption-type polarizer are closely laminated by a pressure-sensitive adhesive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and accompanying drawings which are given by way of illustration only, and thus are not limitative of the present invention and wherein.

DETAILED DESCRIPTION OF PREFERRED EMBODIMENTS

Detailed description will be made below for making the present invention clear, referring to drawings showing specific examples thereof.

Figure 1:
FIG. 1 is a schematic sectional view showing an example of a layer constitution in a transflective film of the present invention.

FIG. 1 is a sectional view schematically showing the layer structure of a transflective film 10 of the present invention. As shown in this figure, the transflective film 10 of the present invention is obtained by coating a transflective layer 21 made of an inorganic compound on a polymer film 22. This polymer film 22 has an in-plane phase retardation value of about 30 μm or less. The transflective film 10 is made to have a reflectance of from about 10% to about 95%. A rough surface may be formed on at least one surface of the polymer film 22, and the transflective layer 21 may be coated on this rough surface, to give a transflective film of the present invention.

The inorganic compound constituting the transflective layer 21 can be used without specific restriction providing it has utilization efficiency of light. The utilization efficiency of light is a value calculated by the following formula (I) or (II).

$$\text{(Utilization efficiency of light)} = [(\text{amount of incident light}) - (\text{amount of absorption light})] \div (\text{amount of incident light}) = 1 - (\text{light absorptance}) \quad (I)$$

$$\text{(Utilization efficiency of light)} = (\text{light transmittance}) + (\text{light reflectance}) \quad (II)$$

The transflective layer 21 is more preferable when the utilization efficiency of light is higher. Therefore, the utilization efficiency of light is preferably about 80% or more, further preferably about 90% or more, particularly preferably about 95% or more.

The inorganic compound constituting the transflective layer 21 is preferably colorless, but a colored inorganic compound can be used for the purpose of imparting an ornamental property. As the inorganic compound for the transflective layer 21, inorganic oxides, inorganic sulfides, inorganic fluorides and the like can be used. Examples of the inorganic oxide include silicon oxide, zinc oxide, titanium oxide, niobium oxide, cerium oxide, indium-tin oxide, tungsten oxide, molybdenum oxide, antimony oxide, aluminum oxide, zirconium oxide and the like. Examples of the inorganic sulfide include zinc sulfide, antimony sulfide and the like. Examples of the inorganic fluoride include aluminum fluoride, barium fluoride, calcium fluoride, cerium fluoride, aluminum fluoride, lanthanum fluoride, lead fluoride, lithium fluoride, magnesium fluoride, niobium fluoride, samarium fluoride, sodium fluoride, strontium fluoride, yttrium fluoride and the like. In the present invention, it is preferable that the inorganic compound constituting the transflective layer 21 has a refractive index of about 1.9 or more, for the purpose of manifesting a reflection property.

In the present invention, a transflective layer 21 composed of at least one layer is formed using these inorganic compounds. If necessary, the transflective layer 21 may be a multiple layer, and in the case of a multiple layer, it may be composed of the same layers or of difference layers, further, a layer other than the inorganic compound layer may be coated. The thickness of the transflective layer 21 is not particularly restricted, and appropriately set depending on the desired transmittance or reflectance. For example, when the inorganic compound is formed of a single layer, a high reflection coating may be formed, namely, the optical thickness of the layer can be made to one-fourth of the specific wavelength in the visible region, or odd number-fold thereof, for enhancing a reflective ability. Optical thickness is described, for example, in "Theory of Optics" pages 91 to 99, written by M. Born and E. Wolf (Tokai University Publication, 5th edition, 1985: English version is published from Pergamon Press). When the transflective layer 21 has a multi-layer constitution, thickness of each layer can be determined depending on the desired transmittance or reflectance, like in the case of a single layer.

The material of the polymer film 22 constituting another layer of the transflective film 10 is not particularly restricted providing it allows transmission of light. For example, synthetic thermoplastic polymers such as polyolefin resins such as polyethylene and polypropylene, polyvinyl chloride resins, vinyl acetate resins, polyester resins such as polyethylene terephthalate and polyethylene naphthalate, cyclic polyolefin resins such as norbornene resins, polycarbonates, polysulfones, polyether sulfones, polyarylates, polyvinyl alcohols, polyacrylates, polymethacrylates and the like, synthetic thermosetting polymers such as epoxy resins, phenol resins, urethane resins and the like, and natural polymers such as cellulose resins such as cellulose diacetate, cellulose triacetate and the like, can be used. The polymer film may also be a laminated film composed of two or more layers, if necessary. In this case, polymer materials of the layers may be the same or different.

A colorless and transparent polymer is preferable for usual use since white is manifested when a transflective liquid crystal display device is used in the transmissive mode, however, it may be colored to give an ornamental property. Further, fine particles can be dispersed to give a function as a light diffusing layer. The material of the fine particle is not particularly restricted, and known organic or inorganic fine particles can be used. As the organic fine particle, for example, particles of polystyrenes, polyolefins such as polyethylene and polypropylene, (meth)acrylic polymers such as polymethacrylates and polyacrylates, and the like, are listed, and cross-linking polymers may also be permissible. Further, copolymers obtained by copolymerizing two or more monomers selected from ethylene, propylene, styrene, methyl methacrylate, benzoguanamine, formaldehyde, melamine, butadiene and the like can be used. As the inorganic fine particles, for example, particles of silica, silicone, titanium oxide, aluminum oxide, calcium carbonate and the like are listed. On the surface of fine particles, coupling treatment may be performed for improving close adherence with a resin. The form of particles is not particularly restricted, and sphere is one preferable form. Though the average-particle diameter of particles is also not restricted particularly, it is preferably in the range from about 1 μm to about 10 μm in view of the influence on polarization and display quality in use in a liquid crystal display device.

Into the polymer film 22, known additives for polymers can be added such as antioxidants, ultraviolet absorbers, plasticizers and the like. Though the thickness of the polymer film 22 is not particularly restricted, it is preferably about 10 μm or more and about 500 μm or less since when it is too thin, handling is difficult, and when too thick, space saving and lightening are prevented. More preferably, it is about 25 μm or more and about 200 μm or less.

On the surface of the polymer film 22, chemical or physical treatments may be performed if necessary such as saponification treatment, corona treatment, easy-adhesion treatment, releasing treatment, hard coat treatment and the like. Of them, coat of so-called easy-adhesion layer, hard coat layer and the like is effective for increasing the adhesion and surface hardness of the transflective layer 21. The surface of the polymer film 22 may be a smooth surface or a rough surface. For formation of a rough surface, known various methods can be used such as transfer of a form by an emboss roll, hair line treatment of shaving the surface by a metal and the like, sand blast method of spraying fine particles onto the surface, a method of applying a thermosetting or photosetting resin containing dispersed fine particles on the surface to form a hardened film, and the like. When the surface of the polymer film 22 is processed into a rough surface, only one surface or both surfaces may be made into a rough surface. When thus at least one surface of the polymer film 22 is a rough surface, it is advantageous to provide a transflective layer 21 made of an inorganic compound on this rough surface.

When the transflective film 10 is singly applied to a liquid crystal display device, it can be placed at any position between a back side absorption-type polarizer and a light source device in a liquid crystal display device. When a reflection-type polarizer is incorporated for utilizing the above-mentioned system improving luminance, it is no problem to place the reflection-type polarizer between the back side absorption-type polarizer and the transflective film, while when the reflection-type polarizer is placed between the transflective film and the light source device, if the transflective film has an in-plane phase retardation, the polarization condition of polarized light transmitted the reflection-type polarizer is changed by the influence of the in-plane phase retardation, leading sometimes to an impossibility of sufficient ability. Therefore, the in-plane phase retardation value of a transflective film, particularly, of a polymer film 22 constituting it is regulated to about 30 nm or less, lowering the influence on polarized light. It is more preferable when the in-plane phase retardation value of the polymer film 22 is smaller, accordingly, it is more preferably about 10 nm or less.

For regulating the in-plane phase retardation value of the polymer film 22 to about 30 nm or less, known methods can be adopted such as a method in which a transparent polymer is made into a film by a casting method or extrusion method, then, the molecular orientation is relaxed by annealing treatment if necessary, to decrease phase retardation, and other methods. Further, transparent polymers not easily manifesting phase retardation can also be used. For example, when norbornene resins, polymethyl methacrylates, cellulose resins such as cellulose diacetate and cellulose triacetate, and the like are used, the in-plane phase retardation value is small and annealing treatment may be unnecessary in general, even if a film is made by an extrusion method.

Figure 2:
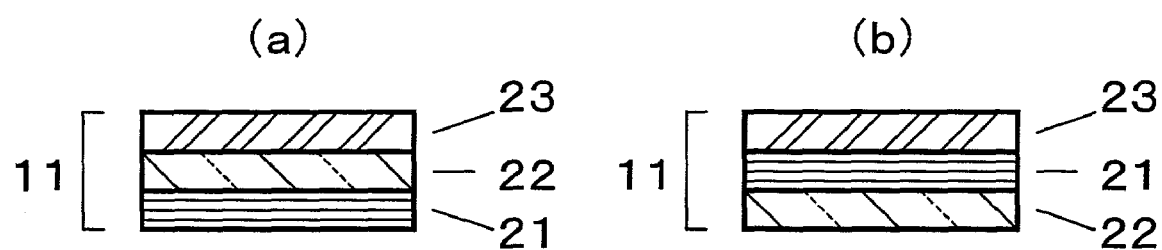
FIGS. 2(a) to 2(b) are schematic sectional views showing an example of a layer constitution in a transflective polarizer of the present invention.

The transflective film 10 obtained by coating the transflective layer 21 made of an inorganic compound on the polymer film 22 as described above can be made into a transflective polarizer by further laminating an absorption-type polarizer. An example of this transflective polarizer 11 is shown in FIG. 2. In this case, the absorption-type polarizer 23 may be placed at the polymer film 22 side constituting the transflective film as shown in FIG. 2(a), or may be placed at the transflective layer 21 side constituting the transflective film as shown in FIG. 2(b), however, if the film 23 is placed so that the polymer film 22 constituting the transflective film faces the absorption-type polarizer 23, the transflective layer 21 forms an interface with air, and the reflectance can be enhanced.

Figure 3:
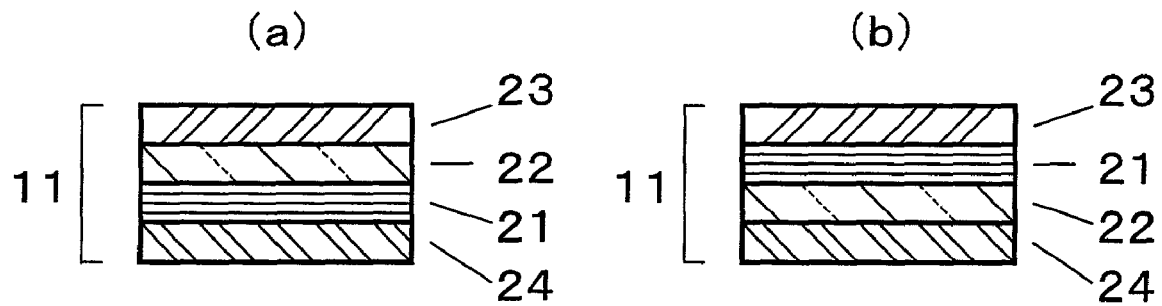
FIGS. 3(a) to 3(b) are schematic sectional views showing an example of a layer constitution when a reflection-type polarizer is used in a transflective polarizer of the present invention.

On this transflective polarizer, a reflection-type polarizer can be further laminated. An example of this case is shown in FIG. 3. FIG. 3(a) shows an example of placing a reflection-type polarizer 24 at the transflective layer 21 side in a layer constitution composed of absorption-type polarizer 23/polymer film 22/transflective layer 21 shown in FIG. 2(a). FIG. 3(b) shows an example of placing a reflection-type polarizer 24 at the polymer film 22 side in a layer constitution composed of absorption-type polarizer 23/transflective layer 21/polymer film 22 shown in FIG. 2(b). When the reflection-type polarizer 24 is thus laminated, the reflection-type polarizer 24 is placed at the opposite side to a surface on which the absorption-type polarizer 23 is placed of the transflective film constituted of the transflective layer 21 and the polymer film 22. For utilizing a system improving luminance with the reflection-type polarizer 24, the polarization transmission axis of the absorption-type polarizer 23 and the polarization transmission axis of the reflection-type polarizer 24 are made approximately parallel.

The absorption-type polarizer 23 allows transmission of polarized light along the specific vibration direction, and absorbs polarizaed light of the crossing direction. The polarization transmission axis of an absorption-type polarizer means a direction at which the transmittance is maximum when polarized light of specific vibration direction is entered along the vertical direction of this polarizer.

As such an absorption-type polarizer, for example, known iodine-based polarizers and dye-based polarizers can be used. The iodine-based polarizer is a film prepared by adsorption of oriented iodine complex onto a streched polyvinyl alcohol film, and the dye-based polarizer is a film prepared by adsorption of an oriented dichroic dye onto a streched polyvinyl alcohol film. These polarizers are preferably laminated with a polymer film, on its one surface or both surfaces, for improvement in durability. As the material of the polymer used for laminating for protection, cellulose diacetate, cellulose triacetate, polyethylene terephthalate, norbornene resins and the like can be used. Use of the polymer film constituting the transflective film of the present invention as the polymer for protecting an absorption-type polarizer is advantageous since then the thickness of a transflective polarizer can be decreased.

Though the thickness of an absorption-type polarizer is not particularly restricted, when the transflective polarizer of the present invention is used in a liquid crystal display device and the like, it is preferable that the thickness of the absorption-type polarizer is smaller. Specifically, the thickness is preferably about 1 mm or less, further preferably about 0.2 mm or less.

The reflection-type polarizer 24 allows transmission of polarized light along the specific vibration direction, and reflection of polarized light of the crossing direction. The polarization transmission axis of a reflection-type polarizer means a direction at which the transmittance is maximum when polarized light of specific vibration direction is entered along the vertical direction of this polarizer, and the polarization reflection axis means a direction crossing it.

As such a reflection-type polarizer, for example, reflection-type polarizers utilizing a difference in the reflectance of polarization components by Brewster angle (for example, those described in WO92/22838), reflection-type polarizers on which fine metal line patterns have been performed (for example, those described in JP-A-2-308106), reflection-type polarizers prepared by laminating at least two kinds of polymer films and utilizing the anisotropy of the reflectance by refractive index anisotropy (for example, those described in WO95/17303), reflection-type polarizers having a sea-island structure formed of at least two kinds of polymers in a polymer film and utilizing the anisotropy of the reflectance by refractive index anisotropy (for example, those described in U.S. Pat. No. 5,825,543), reflection-type polarizers having a structure in which particles are dispersed in a polymer film, and utilizing the anisotropy of the reflectance by refractive index anisotropy (for example, those described in WO97/41484), reflection-type polarizers having a structure in which inorganic particles are dispersed in a polymer film, and utilizing the anisotropy of the reflectance based on a difference in scattering ability depending on the size of particles (for example, those described in JP-A-9-297204), reflection-type polarizers utilizing selective reflection property by a cholesteric liquid crystal (for example, those described in JP-A-3-45906), and the like are listed.

Though the thickness of a reflection-type polarizer is not particularly restricted, when the transflective polarizer of the present invention is used in a liquid crystal display device and the like, it is preferable that the thickness of the reflection-type polarizer is smaller. Specifically, the thickness is preferably about 1 mm or less, further preferably about 0.2 mm or less. Therefore, the reflection-type polarizers prepared by laminating at least two kinds of polymer films and utilizing the anisotropy of the reflectance by refractive index anisotropy, the reflection-type polarizers having a sea-island structure formed of at least two kinds of polymers in a polymer film and utilizing the anisotropy of the reflectance by refractive index anisotropy, and the reflection-type polarizers utilizing selective reflection property by a cholesteric liquid crystal are particularly preferable since the thickness of the transflective polarizer of the present invention is decreased by using them.

Figure 4:
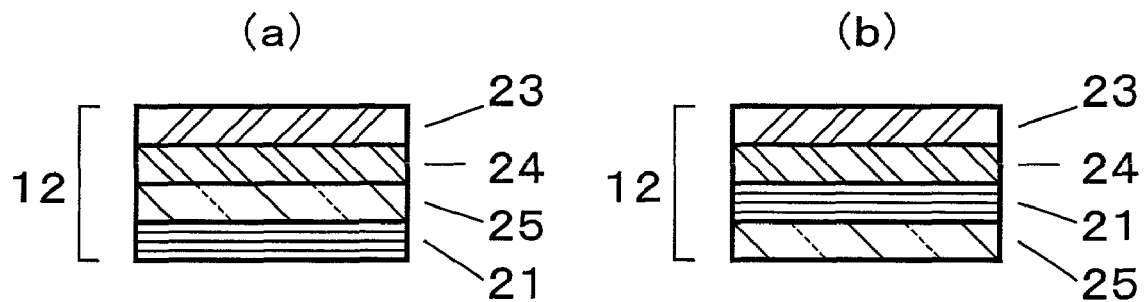
FIGS. 4(a) to 4(b) are schematic sectional views showing another example of a layer constitution in a transflective polarizer of the present invention.

The transflective polarizer (3) 12 of the present invention is obtained by laminating a polymer film 25 having one surface on which a transflective layer 21 made of an inorganic compound is formed, a reflection-type polarizer 24, and an absorption-type polarizer 23 in this order, as shown by the schematic sectional view in FIG. 4.

In this case, though the polymer film 25 and the reflection-type polarizer 24 may be placed so that they are adjacent mutually as shown in FIG. 4(*a*) or the transflective layer 21 and the reflection-type polarizer 24 may be placed so that they are adjacent mutually as shown in FIG. 4(*b*), when the polymer film 25 and the reflection-type polarizer 24 are placed so that they are adjacent mutually as in the former case, the transflective layer 21 forms an interface with air, and the reflectance can be enhanced. The polarization transmission axis of the reflection-type polarizer 24 and the polarization transmission axis of the absorption-type polarizer 23 are made approximately parallel. As the transflective layer 21, reflection-type polarizer 24 and absorption-type polarizer 23, those which can be used in the transflective polarizer (2) 11 of the present invention can be used likewise. As the material used for the polymer film 25, those which can be used in the transflective polarizer (2) 11 of the present invention can be used likewise.

In the transflective layer 20 of the present invention, the in-plane phase retardation value of the polymer film 22 was restricted to about 30 nm or less. The reason for this is to allow a system improving luminance of a liquid crystal display device to function effectively. The system improving luminance is realized by laminating an absorption-type polarizer and a reflection-type polarizer in a polarizing light source device. Here, a transflective film may sometimes intervene between an absorption-type polarizer and a reflection-type polarizer, and in this case, if the transflective film has the in-plane phase retardation, there is a possibility of exerting a reverse influence on the system improving luminance.

However, in the transflective polarizer (3) 12, the lamination order of the polymer film 25 on which the transflective layer 21 has been formed, the reflection-type polarizer 24 and the absorption-type polarizer 23 is determined so as not to exert a reverse influence on the system improving luminance. Therefore, regarding the polymer film 25 here used, the restriction of the in-plane phase retardation value is not necessary.

Figure 5:
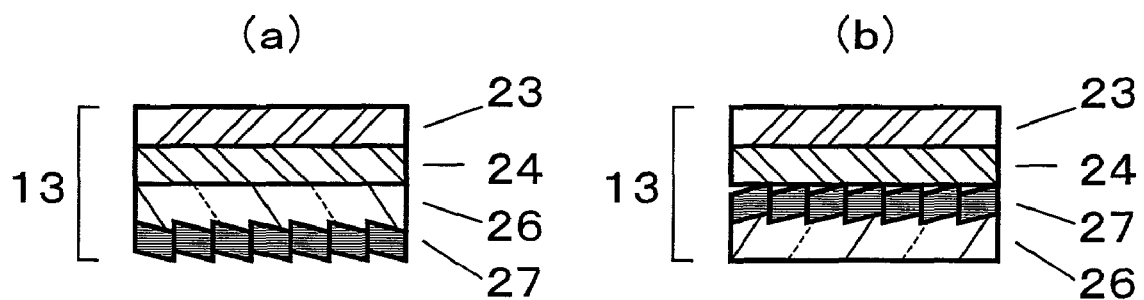
FIG. 5 is a schematic sectional view showing further another example of a layer constitution in a transflective polarizer of the present invention.

The transflective polarizer (4) 13 of the present invention is obtained by laminating a polymer film 26 having on at least one surface an irregular shape formed of a transflective layer 27 made of a metal or inorganic compound, a reflection-type polarizer 24, and an absorption-type polarizer 23 on the same optical path, as shown by the schematic sectional view in FIG. 5. The polarization transmission axis of the reflection-type polarizer 24 and the polarization transmission axis of the absorption-type polarizer 23 are made approximately parallel. In an example shown in FIG. 5(*a*), the irregular form of the polymer film 26 is placed outside of the transflective polarizer 13. In an example shown in FIG. 5(*b*), the irregular form is placed at the reflection-type polarizer 24 side of the polymer film 26. As the reflection-type polarizer 24 and absorption-type polarizer 23, those which can be used in the transflective polarizer (2) 11 of the present invention can be used likewise. As the material used for the polymer film 26, those which can be used in the transflective polarizer (3) 12 of the present invention can be used likewise. When used in the transflective polarizer (4) 13, the restriction of the in-plane phase retardation value is not necessary because of the same reason as for the transflective polarizer (3) 12.

Figure 6:
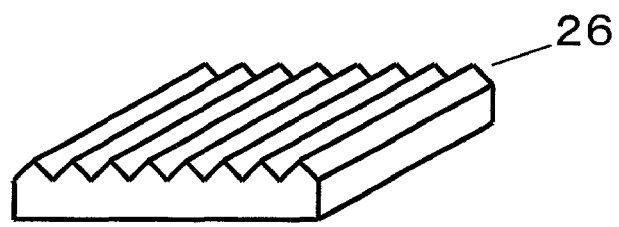
FIG. 6 is a perspective view schematically showing an example of an irregular form.
Figure 7:
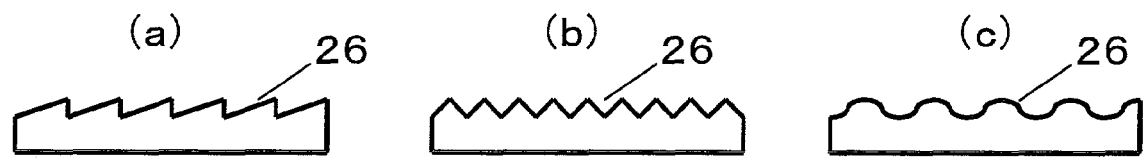
FIGS. 7(a) to 7(c) are views schematically showing several examples of the section of an irregular form.
Figure 8:
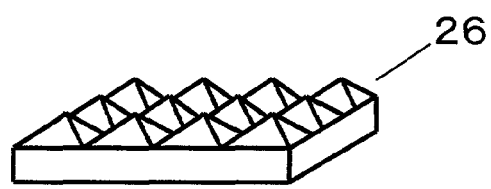
FIG. 8 is a perspective view schematically showing another example of an irregular form.

The specific form of the irregularity formed on at least one surface of the polymer film 26 is not particularly restricted, and may be a random rough surface or that having a regular structure. As the regular structure, for example, a structure in the form of stripe as shown in FIG. 6 is mentioned, and the sectional surface of which may be in the form of saw blade as shown in FIG. 7(*a*), in the form of isosceles triangle as shown in FIG. 7(*b*), or in the form of wave as shown in FIG. 7(*c*). As the regular structure, for example, a lattice structure as shown in FIG. 8 may be used, and the each unit of the lattice may be in the form of pyramid such as square pyramid and the like, cone or hemisphere or wave. These forms may be compounded, further, finer random forms may be imparted in addition to the regular forms.

The random rough surface can be provided by known various methods such as transfer of form by an emboss roll, hair line treatment of shaving the surface by a metal and the like, sand blast method of spraying fine particles onto the surface, a method of applying a thermosetting or photosetting resin containing dispersed spherical or amorphous fine particles on the surface to form a hard-coated film, and the like. The rough surface of regular form can be provided by known various methods such as a method of extrusion through a dice, a method of embossing by a roll, and the like. In the case of a regular form, the pitch of the top lies within the range of preferably from about 10 to about 500 μm in view of use of the transflective polarizer of the present invention in a liquid crystal display device. Angle and inclination and the like of the surface can be freely set corresponding to desired abilities.

On these rough surfaces, a transflective layer made of a metal or inorganic compound is formed. As the transflective layer made of an inorganic compound, those which can be used for the transflective film 10 of the present invention can be used likewise. As the metal, aluminum, silver and the like can be suitably used.

Use of a metal thin film as a transflective layer is a simple method, and can be applied not only in the transflective polarizer (4) but also in the transflective polarizers (1) to (3). However, in general, metals show more significant absorption in the visible range as compared with inorganic compounds, and further, this absorption increases in the case of a transflective layer respecting transmission, consequently, utilization efficiency of light thereof tends to be somewhat inferior as compared with inorganic compounds. On the other hand, when a metal is used, a transflective layer respecting reflection is easily formed. In the case of the transflective polarizer (4) 13, particularly when a transflective layer respecting reflection is used, an effect of deviating the main reflection direction of outer light out of the mirror surface reflection direction at the most outer surface of a liquid crystal display device increases, leading to excellent visibility of a display screen. Namely, in the case of the transflective polarizer (4), a function of controlling the outer light reflection direction in a design respecting reflection is added, in addition to effective utilization of a system improving luminance, and improvement in visibility outside by impartment of a reflection ability.

Figure 9:
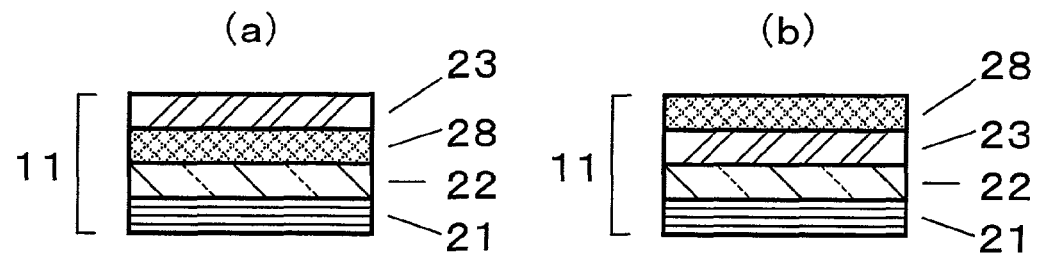
FIG. 9 is a schematic sectional view showing an example of a layer constitution when a light diffusing layer is used in a transflective polarizer of the present invention.

For realizing white and clear vision in use of a transflective polarizer as a reflective mode, diffusing of ambient light at somewhere is necessary. In use as transmission type, it may be preferable in some cases to impart a light diffusing layer for the purpose of making the illumination of a light source device uniform. An example in this case is shown in FIG. 9. FIG. 9(a) is an example showing a layer constitution composed of absorption-type polarizer 23/polymer film 22/transflective layer 21 shown in FIG. 2(a) wherein a light diffusing layer 28 is placed between the absorption-type polarizer 23 and the polymer film 22. FIG. 9(b) is likewise an example showing a layer constitution shown in FIG. 2(a) wherein a light diffusing layer 28 is placed outside of the absorption-type polarizer 23. When a light diffusing layer 28 is thus laminated, the light diffusing layer 28 can be placed on any one surface of the absorption-type polarizer 23, however, if desired, the light diffusing layer 28 can be placed on both surfaces of the absorption-type polarizer 23. Though FIG. 9 shows examples of adding a light diffusing layer 28 to a layer structure of FIG. 2(a), a light diffusing layer 28 can be placed on one surface of both surfaces of an absorption-type polarizer 23 or a reflection-type polarizer 24 also in layer constitutions of any of FIGS. 2 to 5, additionally.

It is preferable that the light diffusing layer 28 does not exert an influence on polarized light transmitted in a transflective liquid crystal display device, for example, it is preferable the in-plane phase retardation value thereof is about 30 nm or less. Since it is advantageous that the light diffusing layer 28 shows high total light transmittance, the total light transmittance is preferably about 80% or more, more preferably about 90% or more. The haze which is an index showing the diffusing ability of the light diffusing layer 28 is optionally set depending on the desired diffusing ability, and usually about 30% or more and about 95% or less, preferably about 60% or more and about 95% or less. Here, the haze is a value represented by the formula:

$$(\text{diffusing light transmittance})/(\text{total light transmittance}) \times 100(\%).$$

The material of the light diffusing layer 28 is not particularly restricted, and polymer films and light diffusing pressure-sensitive adhesives each containing dispersed organic or inorganic fine particles and refractive index modulation-type light diffusing films, and the like, for example, are suitably used. For reducing the number of members of a transflective polarizer to decrease the thickness, the light diffusing pressure-sensitive adhesive containing dispersed organic or inorganic fine particles is one of particularly preferable light diffusing layers. Here, as the material constituting the organic or inorganic fine particles, polymethyl-methacrylate, polystyrene, silicone, silica, titanium oxide and the like are listed.

For making handling of a transflective polarizer of the present invention easy, it is preferable that constituent films and interlaminar spaces are closely adhered with a pressure-sensitive adhesive. By close adherence, loss of light by unnecessary reflection can be prevented. As the pressure-sensitive adhesive, known various adhesives can be used. For example, acrylate-based pressure-sensitive adhesives, rubber-based pressure-sensitive adhesives, silicone-based pressure-sensitive adhesives, urethane-based pressure-sensitive adhesives, and the like are listed. Of them, acrylate-based pressure-sensitive adhesives are preferably used. The thickness of the pressure-sensitive adhesive is not particularly restricted, and usually about 1 μm or more and about 100 μm or less, preferably about 20 μm or more and about 50 μm or less.

On the transflective polarizer of the present invention, a phase retarder may also be laminated for effecting optical compensation. Examples of the suitable phase retarder include films obtained by mono-axial or bi-axial stretching of films composed of synthetic polymers such as polycarbonates, polyarylates, polysulfones, norbornene resins and the like, or natural polymers such as cellulose diacetate, cellulose triacetate and the like, and films obtained by applying a compound or liquid crystal composition having optical anisotropy on a transparent polymer film (for example, "WV film" manufactured by Fuji Photo Film Co., Ltd., "NH film" and "LC film" manufactured by Nippon Sekiyu Kagaku K.K., "VAC film" manufactured by Sumitomo Chemical Co., Ltd., and the like). When optical compensation of a liquid cell is intended, a phase retarder is placed to the liquid cell side of a transflective polarizer. It is desirable that these members are closely laminated with a pressure-sensitive adhesive for preventing loss of light due to intervention of an air layer.

A polarizing light source device can be made using the transflective polarizer of the present invention, in which absorption-type polarizer side of the transflective polarizer is used as a light emitting surface. Further, a display liquid crystal cell can be placed at the absorption-type polarizer side of the polarizing light source device to make a transflective liquid crystal display device. These polarizing light source device and transflective liquid crystal display device will be illustrated based on examples shown in the schematic sectional views of FIGS. 10 to 12.

Figure 10:
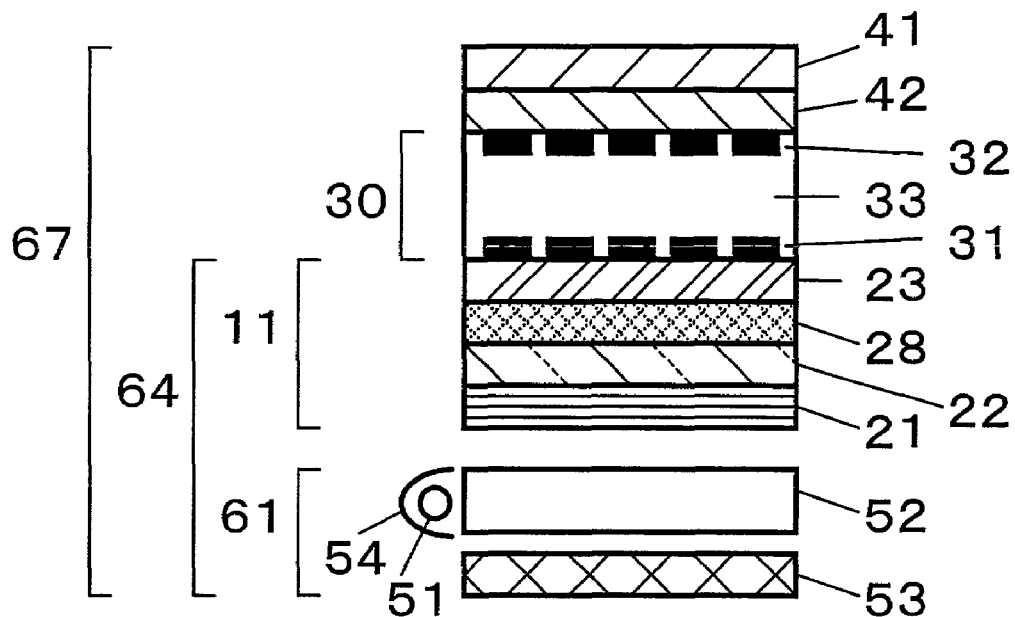
FIG. 10 is a schematic sectional view showing an example of a liquid crystal display device of the present invention.
Figure 11:
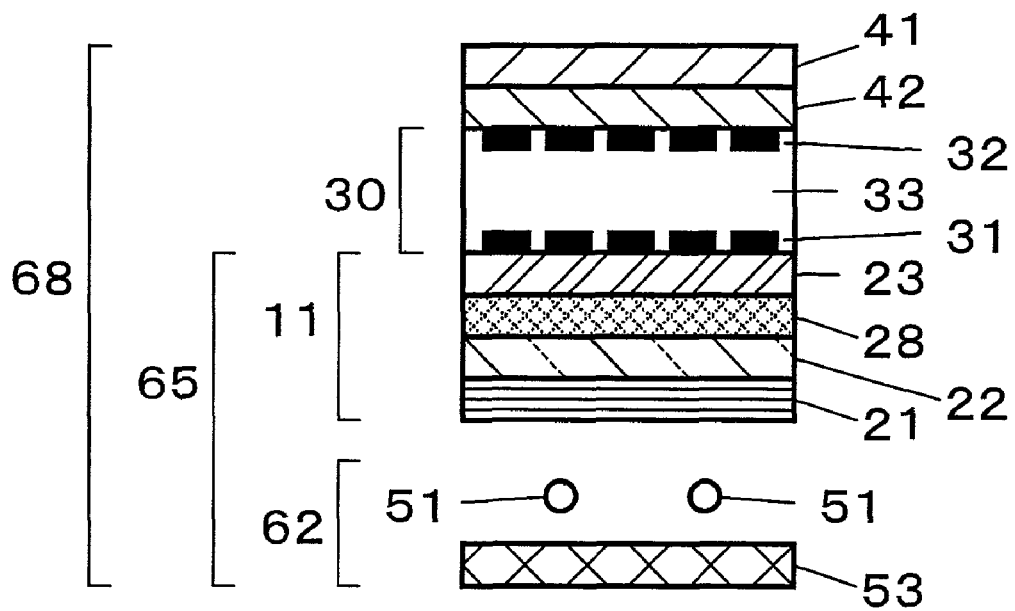
FIG. 11 is a schematic sectional view showing another example of a liquid crystal display device of the present invention.

In examples shown in FIGS. 10 and 11, a light source device 61 or 62 is placed at the transflective layer 21 side of a transflective polarizer 11 obtained by laminating the same transflective layer 21 made of an inorganic compound, polymer film 22 having an in-plane phase retardation value of about 30 nm or less, light diffusing layer 28 and absorption-type polarizer 23 as shown in FIG. 4(a) in this order, to constitute a polarizing light source device 64 or 65.

The light source device 61 in FIG. 10 is called side light type, and comprises a light source 51, light guide plate 52, and a reflector 53 placed at the back of the light guide plate 52, and light from the light source 51 placed at the side face of the light guide plate 52 is reflected by a reflecting mirror 54 covering the side not facing the light guide plate 52 of the light source 51, and first entered into the light guide plate 52, progresses therein, and emitted uniformly from the front surface side of the light guide plate 52, together with reflection at the reflector 53. Such a light source device 61 is placed at the transflective layer 21 side of the transflective polarizer 11, to constitute a polarizing light source device 64. Further, the absorption-type polarizer 23 side of the transflective polarizer 11 is placed facing the back of a liquid crystal cell 30, and a phase retarder 42 and an absorption-type polarizer 41 are placed at the front surface side of the liquid crystal cell 30, to constitute a transflective liquid crystal display device 67.

On the other hand, the light source device 62 in FIG. 11 is called subjacent type, and comprises a light source 51, and a reflector 53 placed at the back side of the light source, and directly emitted light from the light source 51 and reflected light by the reflector are both used for illumination. Such a light source device 62 is placed at the transflective layer 21 side of the transflective polarizer 11, to constitute a polarizing light source device 65. Further, the absorption-type polarizer 23 side of the transflective polarizer 11 is placed facing the back of a liquid crystal cell 30, and a phase retarder 42 and an absorption-type polarizer 41 are placed at the front surface side of the liquid crystal cell 30, to constitute a transflective liquid crystal display device 68.

As described above, in the polarizing light source device of the present invention, the light source device 61 or 62 is placed at the transflective layer 21 side of the transflective polarizer 11 as exemplified in FIGS. 2 to 4. Here, the light source device comprises a light source member and a reflector, and any of the so-called side light mode light source device as exemplified in FIG. 10 and the so-called subjacent mode light source device as exemplified in FIG. 11 can be used. In the case of the side light mode as shown in FIG. 10, a light source member is constituted of the light source 51 and the light guide plate 52. In the light source device, a diffusion sheet and a lens sheet can be placed at the emitting surface side thereof, if necessary. Particularly, in the side light mode, diffusion sheets and lens sheets are widely used also in conventional polarizing light source devices, and also in the polarizing light source device of the present invention, one of them or both of them can be placed likewise.

Figure 12:
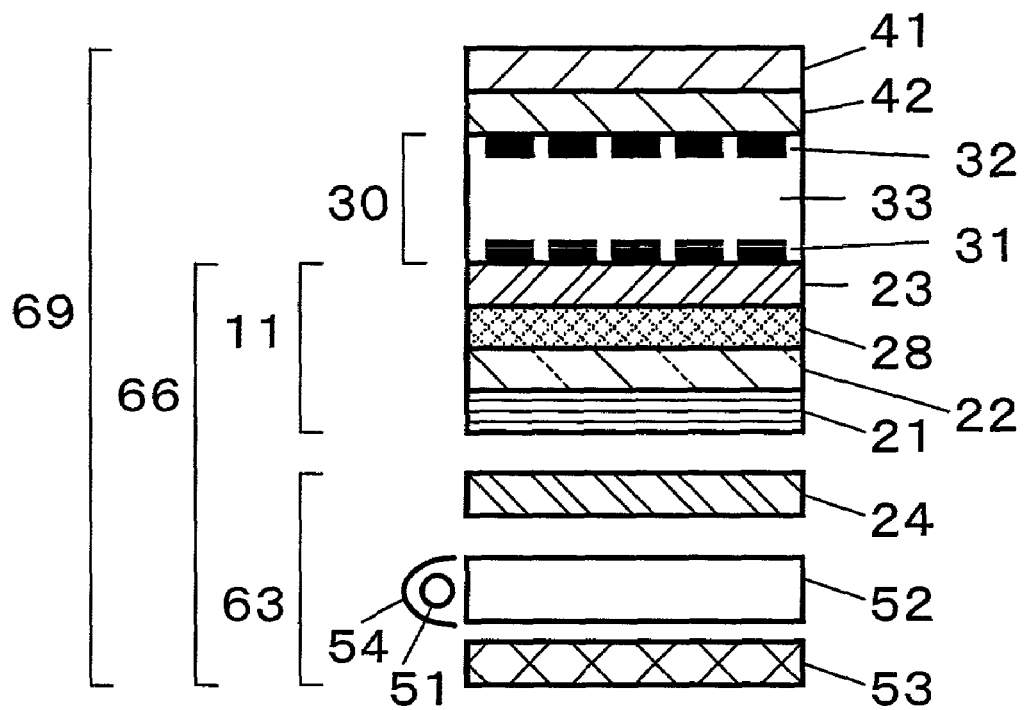
FIG. 12 is a schematic sectional view showing further another example of a liquid crystal display device of the present invention.

In the example of FIG. 12, a reflection-type polarizer 24 is placed on the light source device 61 constituted of the light source 51 as shown in FIG. 10, light guide plate 52 and reflector 53, to obtain another light source device 63, and by this, a polarizing light source device 66 and a transflective liquid crystal display device 69 utilizing a system improving luminance are provided. In this case, the polarization transmission axis of the reflection-type polarizer 24 is approximately parallel to the polarization transmission axis of the absorption-type polarizer 23 placed at the back surface side of the liquid crystal cell. Though the reflection-type polarizer 24 is described here as a part of the light source device 63, a layer structure of absorption-type polarizer 23/light diffusing layer 28/polymer film 22/transflective layer 21/reflection-type polarizer 24 can also be regarded as the transflective polarizer of the present invention.

In the polarizing light source device and transflective liquid crystal display device illustrated in FIGS. 10 to 12, the light source 51 used in the light source devices 61 to 63 is not particularly restricted, and those adopted in known polarizing light source devices and liquid crystal display devices can also be used in the present invention likewise. As the suitable light source 51, specifically, cold cathode tubes, light emitting diodes, inorganic or organic electroluminescence (EL) lamps and the like are listed, for example.

The reflector 53 is also not particularly restricted, and those adopted in known polarizing light source devices and liquid crystal display devices can also be used in the present invention. Specifically, a white plastic sheet having a cavity formed inside, a plastic sheet on the surface of which a white pigment such as titanium oxide and zinc oxide is applied, a multi-layer plastic sheet obtained by laminating at least two plastic films having different refractive indices, a sheet made of a metal such as aluminum and silver, and the like are listed, for example. As these sheets, any of those having a mirror-finished surface and those having a roughened surface can be used. The material of a plastic sheet constituting the reflector also is not particularly restricted, and for example, polyethylene, polypropylene, polyvinyl chloride, polyethylene terephthalate, polyethylene naphthalate, polycarbonate, norbornene resins, polyurethane, polyacrylate, polymethyl methacrylate and the like can be used.

The light guide plate 52 shown in FIGS. 10 and 12 takes is light emitted from the light source 51 and functions as a sheet emitting body, and also, those adopted in known polarizing light source devices and liquid crystal display devices can be used. As such a light guide plate, those composed of a plastic sheet or a glass plate and on the back surface thereof irregular treatment, white dot printing treatment, hologram treatment and the like are performed are listed, for example. When a light guide plate is constituted of a plastic sheet, the material thereof is not particularly restricted, and polycarbonates, norbornene resins, polymethyl methacrylate and the like are preferably used.

The diffusion sheet placed, if necessary, at the emitting surface side of a light source device is a sheet diffusing and allowing transmission of incident light, and usually an optical element showing a total light transmittance of about 60% or more and a haze of about 10% or more. Here, it is more advantageous when the total light transmittance of a diffusing sheet is higher, and those showing a total light transmittance of about 80% or more are more preferable. Such a diffusing sheet is not particularly restricted, and for example, plastic sheets and glass plates which have been subjected to surface roughening treatment, and plastic sheets and glass plates having a cavity formed inside or containing particles added, can be used. The material of the plastic sheets herein referred to is also not particularly restricted, and for example, polyethylene, polypropylene, polyvinyl chloride, polyethylene terephthalate, polyethylene naphthalate, polycarbonate, norbornene resins, polyurethane, polyacrylate, polymethyl methacrylate and the like are listed. The surface roughening treatment is also not particularly restricted, and there are mentioned sand blast, processing by press fitting by emboss rolls, a method in which a mixture obtained by mixing particles such as plastic particles, glass particles and silica particles into a resin is applied on the surface, and other methods are listed.

A lens sheet placed, if necessary, on the emitting surface side of a light source device condenses light emitted from a light source, and also, those adopted in known polarizing light source devices and liquid crystal display devices can be used. As such a lens sheet, for example, plastic sheets on which a lot of fine prisms are formed, micro lens arrays of convex lenses and concave lenses placed closely, and the like are listed.

In the transflective liquid crystal display device of the present invention, the liquid crystal cell 30 and the front side absorption-type polarizer 41 are placed in this order onto the transflective polarizer 11 side which is a light emitting surface in the polarizing light source device 64, 65 or 66, as exemplified in FIGS. 10 to 12. Here, one or more phase retarders 42 can be placed, if necessary, between the liquid crystal cell 30 and the front side absorption-type polarizer 41, and further if necessary, a light diffusing layer can also be placed at the front surface side of the liquid crystal cell 30. Further, both of the phase retarder and the light diffusing layer may also be placed. Regarding members constituting the transflective liquid crystal display device, particularly, members from the transflective polarizer 11 to the front side absorption-type polarizer 41, it is preferable that at least one pair of adjacent members are closely laminated by a pressure-sensitive adhesive, further, it is more preferable that all of adjacent members are closely laminated with a pressure-sensitive adhesive.

The liquid crystal cell 30 used in a liquid crystal display device is an apparatus having a mechanism in which liquid crystal is enclosed between two substrates and the orientation condition of the liquid crystal is varied by applying voltage, for switching the light transmission quantity. The back surface side transparent electrode 31 and the front surface side transparent electrode 32 are placed onto the inner sides of two substrates respectively, and a liquid crystal layer 33 is sandwiched between them. Though the drawing is omitted, the liquid crystal cell 30 has also an orientation film for orienting the liquid crystal layer 33, and a color filter layer and the like in the case of color display, and the like, in addition to the above-mentioned members. In the present invention, the kind of liquid crystal constituting the liquid crystal cell 30 and the operation mode thereof are not particularly restricted, and known twisted nematic (TN) liquid crystal, super twisted nematic (STN) liquid crystal and the like can be used, further, the present invention can be applied to all methods of conducting display using polarization such as a thin film transistor (TFT) operation method, vertical orientation (VA) method, In-plane operation method, optical compensation band (OCB) and the like.

As the front side absorption-type polarizer 41, the same films as previously described as examples of an absorption-type polarizer constituting the transflective polarizer of the present invention can be used. As the phase retarder 42 placed if necessary between the liquid crystal cell 30 and the front side absorption-type polarizer 41, stretched resin films are usually used, and listed as the suitable examples thereof are films obtained by stretching mono-axially or bi-axially synthetic thermoplastic polymers such as polycarbonates, polyarylates, polysulfones, polyvinyl alcohols, cyclic polyolefins typically including norbornene resins and natural polymers typically including cellulose triacetate, and the like by a stretching machine such as a tenter and the like. Further, films obtained by applying a liquid crystal compound on a transparent polymer film, for example, "WV film" (trade name), manufactured by Fuji Photo Film Co., Ltd., "LC film" (trade name), manufactured by Nippon Sekiyu Kagaku K.K., "VAC film" (trade name), manufactured by Sumitomo Chemical Co., Ltd., and the like can also be used as the phase retarder 42. Further, when a light diffusing layer is laminated on the front surface side of the liquid crystal cell 30, those previously explained as examples of a light diffusing layer constituting a transflective polarizer can be used.

EXAMPLES

The examples of the present invention are shown below, but the scope of the invention is not limited to them.

In the examples, the materials used for production of a transflective film or a transflective polarizer are as described below.

(1) Inorganic Compound
  (1-1) Inorganic Oxide
    Niobium oxide ($Nb_2O_5$): refractive index: 2.20
  (1-2) Inorganic Sulfide
    Zinc sulfide (ZnS): refractive index: 2.30

(2) Polymer Film
  HC-TAC: A smooth hard coat layer is formed on one surface of a cellulose triacetate film made by a casting method, and another surface is saponification-treated. The in-plane phase retardation value is 4 nm.
  AG5-TAC: A rough surface hardened film (antiglare-treated layer) made of a photosetting resin containing dispersed fine particles is formed on one surface of a cellulose triacetate film made by a casting method, and another surface is saponification-treated. The haze showing light diffusion property of a rough surface is 13%, and the in-plane phase retardation value is 4 nm.
  AG6-TAC: A rough surface hardened film (antiglare-treated layer) made of a photosetting resin containing dispersed fine particles is formed on one surface of a cellulose triacetate film made by a casting method, and another surface is saponification-treated. The haze showing light diffusion property of a rough surface is 25%, and the in-plane phase retardation value is 4 nm.

(3) Absorption-Type Polarizer
  SRW862A: Iodine-based absorption-type polarizer: available from Sumitomo Chemical Co., Ltd.

(4) Reflection-Type Polarizer
  DBEF-P: Reflection-type polarizer obtained by laminating two polymer films and utilizing the anisotropy of reflectance by refractive index anisotropy: available from Sumitomo 3M.

(5) Light Diffusing Layer
  Light diffusive pressure-sensitive adhesive #B: Acrylate-based pressure-sensitive adhesive containing dispersed fine particles and having a haze of 78%: available from Sumitomo Chemical Co., Ltd.

(6) Pressure-Sensitive Adhesive
  Pressure-sensitive adhesive #7: Colorless and transparent acrylate-based pressure-sensitive adhesive: available from Sumitomo Chemical Co., Ltd.

Reference Example 1

Using HC-TAC which is a polymer film having an in-plane phase retardation value of 4 nm, the light transmittance was measured by the following method (A) and the light reflectance was measured by the following method (B). Further, utilization efficiency of light was evaluated by the following method (C) based on the measured values.

The results are shown in Table 1.

(A) Light Transmittance

The total light transmittance was measured by using a haze computer "HGM-2DP" manufactured by Suga Test Instrument Co. Ltd.

(B) Light Reflectance

The light reflectance was measured by using a reflectance transmittance meter "HR-100" manufactured by Murakami Shikisai Gijutsu Kenkyusho.

(C) Utilization Efficiency of Light

The sum of the measured values of the above-mentioned (A) and (B) was used as the utilization efficiency of light. Though the upper limit of the utilization efficiency of light is essentially 100%, some calculated utilization efficiency of light showed a value of over 100%. This is a result of influences of the measuring apparatus, such as a difference between the light incident angle in measuring the light transmittance and the light incident angle in measuring the light reflectance, and the like.

Example 1

On the hard coat layer of HT-TAC used in Reference Example 1, niobium oxide as an inorganic compound was coated by a vapor-deposition method using an optical multi-layer film formation high-vacuum vapor deposition apparatus manufactured by Shinku Kikai Kogyo K.K., to form a transflective layer. In this procedure, a glass for monitoring the light transmittance was placed into a chamber, and vapor deposition was stopped when the light transmittance first reaches the minimum value. The resulted transflective film composed of polymer film and niobium oxide layer was evaluated in the same manner as in Reference Example 1. The results are shown in Table 1.

Example 2

A transflective film was produced and evaluated in the same manner as in Example 1 except that zinc sulfide was used as an inorganic compound instead of niobium oxide. The results are shown in Table 1.

Example 3

A transflective film was produced and evaluated in the same manner as in Example 1 except that AG5-TAC was used as a polymer film instead of HC-TAC and on its antiglare-treated layer, a transflective layer was formed by vapor deposition. The results are shown in Table 1.

Example 4

A transflective film was produced and evaluated in the same manner as in Example 2 except that AG5-TAC was used as a polymer film instead of HC-TAC and on its antiglare-treated layer, a transflective layer was formed by vapor deposition. The results are shown in Table 1.

Example 5

A transflective film was produced and evaluated in the same manner as in Example 1 except that AG6-TAC was used as a polymer film instead of HC-TAC and on its antiglare-treated layer, a transflective layer was formed by vapor deposition. The results are shown in Table 1.

Example 6

A transflective film was produced and evaluated in the same manner as in Example 2 except that AG6-TAC was used as a polymer film instead of HC-TAC and on its antiglare-treated layer, a transflective layer was formed by vapor deposition. The results are shown in Table 1.

TABLE 1

|  | Inorganic compound | Polymer film | Light transmittance | Light reflectance | Utilization efficiency of light |
| --- | --- | --- | --- | --- | --- |
| Reference Example 1 | None | HC-TAC | 93% | 9% | 102% |
| Example 1 | $Nb_2O_5$ | HC-TAC | 75% | 22% | 97% |
| Example 2 | ZnS | HC-TAC | 72% | 27% | 99% |
| Example 3 | $Nb_2O_5$ | AG5-TAC | 74% | 22% | 96% |
| Example 4 | ZnS | AG5-TAC | 69% | 27% | 96% |
| Example 5 | $Nb_2O_5$ | AG6-TAC | 75% | 22% | 97% |
| Example 6 | ZnS | AG6-TAC | 66% | 29% | 95% |

The transflective films obtained in the above-mentioned examples can be singly incorporated into a liquid crystal display device, and additionally, can be combined with an absorption-type polarizer, or if necessary, further combined with a reflection-type polarizer and/or light diffusive pressure-sensitive adhesive, and used as transflective polarizers. These transflective polarizers can be used singly as a back surface side member of a transflective liquid crystal display device, and additionally, by separately using a reflection-type polarizer in a light source device, a system improving luminance can be utilized, and a bright screen can be provided.

Reference Example 2

Figure 13:
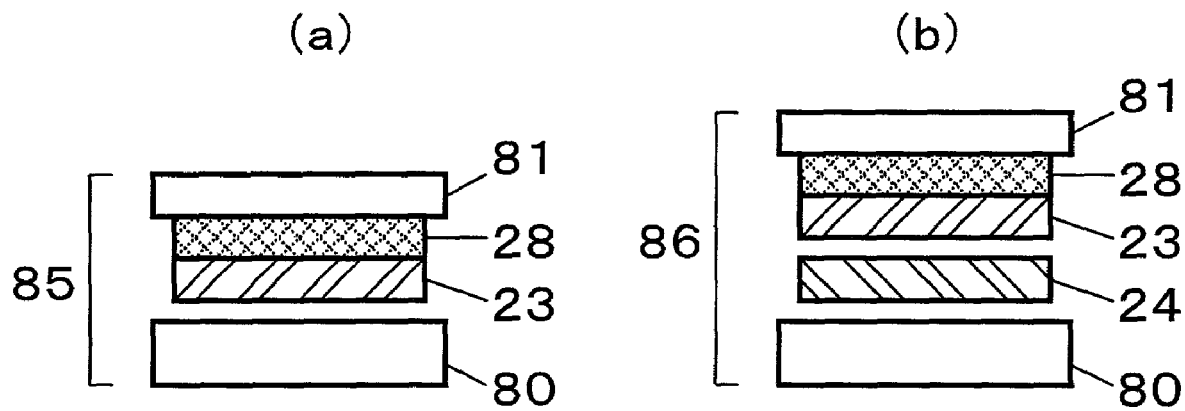
FIGS. 13(a) to 13(b) are schematic sectional views showing a constitution of a polarizing light source device evaluated in Reference Example 2.

A touch panel and a liquid crystal panel were removed from a pen touch mode portable information terminal (also referred to as pocket PC) "CASSIOPEIA E-700" manufactured by Casio Computer Co., Ltd., to make condition under which only a light source device can be used. As shown in FIG. 13(a), an absorption-type polarizer 23 and a light diffusing layer 28 were closely laminated to give a sample which was pasted on a glass plate 81 having a thickness of 1.1 mm, and the resulted article was placed on the light source device 80 so that the glass plate 81 was situated at upper side, producing a polarizing light source device 85. On the other hand, as shown in FIG. 13(b), between the absorption-type polarizer 23 and the light source device 80, a reflection-type polarizer 24 (DBEF-P) was inserted so that the polarization transmission axis thereof was parallel to the polarization transmission axis of the absorption-type polarizer 23, to produce a polarizing light source device 86 using a reflection-type polarizer. Using these polarizing light source devices 85 (reflection-type polarizer is not used) and 86 (reflection-type polarizer is used), the transmission luminance and reflection luminance were measured by the following method (D). The results are shown in Table 2. The laminated films produced in this example had reflection luminance of 400 cd/m$^2$ or less when a reflection-type polarizer was not used and reflection luminance of 450 cd/m$^2$ or less when a reflection-type polarizer was used.

(D) Luminance Evaluation Method

Figure 14:
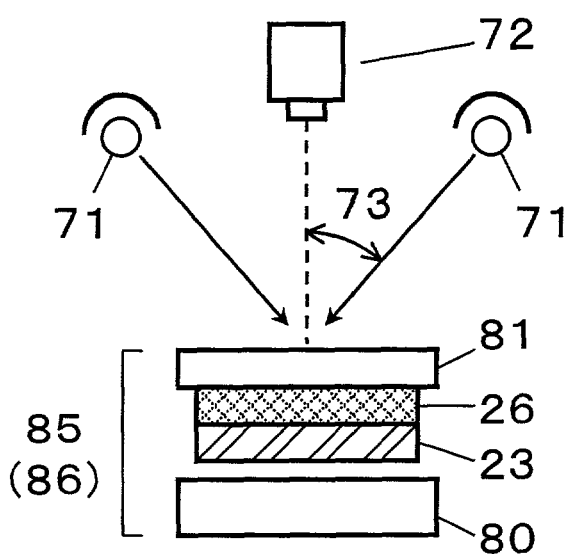
FIG. 14 is a schematic sectional view showing a constitution of an apparatus used for luminance measurement in Reference Example 2.

A loupe was removed from a round loupe (trade name: "ENV-B-2" manufactured by Otsuka Kogaku K.K., and on its pedestal, the polarizing light source device 85 produced above was placed horizontally. As shown in FIG. 14, a circular fluorescent lamp 71 of the round loupe was placed horizontally as shown in FIG. 14, further, the height from the pedestal (not shown) was controlled, to regulate the illumination angle 73 to the pedestal when the circular fluorescent lamp was on (inclination of light to normal line direction of pedestal) to 15°. Above the pedestal, a luminance meter 72 (trade name: "BM-7" manufactured by Topcon K.K.) was placed for measuring luminance. The measurements were all conducted in a dark room.

(D-1) Measurement of Transmission Luminance

The transmission luminance of the polarizing light source device 85 was measured by the luminance meter 72 under conditions in which the polarizing light source device 85 was on and the circular fluorescent lamp 71 was off.

(D-2) Measurement of Reflection Luminance

The reflection luminance of the polarizing light source device 85 was measured by the luminance meter 72 under conditions in which the polarizing light source device 85 was off and the circular fluorescent lamp 71 was on.

Example 7

Figure 15:
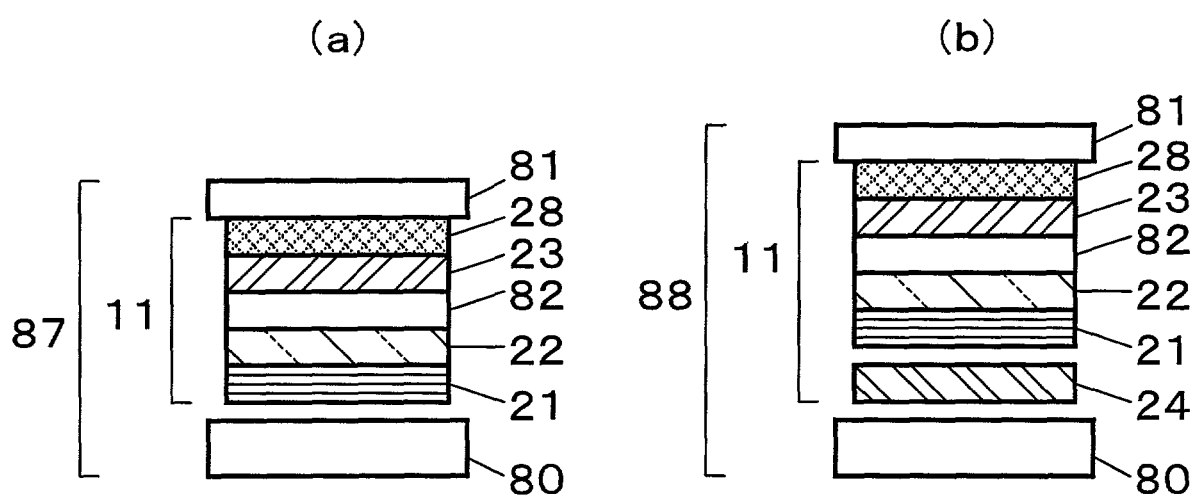
FIGS. 15(a) to 15(b) are schematic sectional views showing a constitution of a polarizing light source device evaluated in Reference Example 7.

As shown in FIG. 15(*a*), the pressure-sensitive adhesive 82, absorption-type polarizer 23 and light diffusing layer 28 were closely laminated in this order on the polymer film 22 side of the transflective film composed of polymer film 22 and transflective layer 21 produced in Example 1, to produce a transflective polarizer 11. The glass plate 81 having a thickness of 1.1 mm was pasted on the light diffusive pressure-sensitive adhesive #B which is the light diffusing layer 28 of this transflective film 11, and the resulted article was placed on the light source device 80 used in Reference Example 2 so that the glass plate 81 was situated at the upper side, producing a polarizing light source device 87. On the other hand, as shown in FIG. 15(*b*), between the transflective layer 21 of the transflective film and the light source device 80, a reflection-type polarizer 24 (DBEF-P) was inserted so that the polarization transmission axis thereof was parallel to the polarization transmission axis of the absorption-type polarizer 23, to produce a polarizing light source device 88 using a reflection-type polarizer. Using these polarizing light source devicees 87 (reflection-type polarizer is not used) and 88 (reflection-type polarizer is used), the transmission luminance and reflection luminance were measured by the same manner as shown in (D) of Reference Example 2. The results are shown in Table 2. The transflective polarizers produced in this example had a reflection luminance of 450 cd/m² or more when a reflection-type polarizer was not used, showing brightness sufficient to illuminate a display screen outside. Further, the transflective polarizers produced in this example had a reflection luminance of 550 cd/m² or more when a reflection-type polarizer was used, confirming further improvement in visibility, in use under reflection mode.

Example 8

Evaluation was conducted in the same manner as in Example 7 except that as the transflective film, one produced in Example 2 was used. The results are shown in Table 2. The transflective polarizers produced in this example had a reflection luminance of 450 cd/m² or more when a reflection-type polarizer was not used, showing brightness sufficient to illuminate a display screen outside. Further, the transflective polarizers produced in this example had a reflection luminance of 550 cd/m² or more when a reflection-type polarizer was used, confirming further improvement invisibility, in use under reflection mode.

Example 9

Evaluation was conducted in the same manner as in Example 7 except that as the transflective film, one produced in Example 3 was used and further, a transparent pressure-sensitive adhesive #7 was used instead of the light diffusing layer 28. The results are shown in Table 2. The transflective polarizers produced in this example showed improved transmission luminance and reflection luminance and improved visibility as compared with Reference Example 2, irrespective of use or no-use of a reflection-type polarizer.

Example 10

Evaluation was conducted in the same manner as in Example 7 except that as the transflective film, one produced in Example 4 was used and further, a transparent pressure-sensitive adhesive #7 was used instead of the light diffusing layer 28. The results are shown in Table 2. The transflective polarizers produced in this example showed improved transmission luminance and reflection luminance and improved visibility as compared with Reference Example 2, irrespective of use or no-use of a reflection-type polarizer.

Example 11

Evaluation was conducted in the same manner as in Example 7 except that as the transflective film, one produced in Example 5 was used and further, a transparent pressure-sensitive adhesive #7 was used instead of the light diffusing layer 28. The results are shown in Table 2. The transflective polarizers produced in this example showed improved transmission luminance and reflection luminance and improved visibility as compared with Reference Example 2, irrespective of use or no-use of a reflection-type polarizer.

Example 12

Evaluation was conducted in the same manner as in Example 7 except that as the transflective film, one produced in Example 6 was used and further, a transparent pressure-sensitive adhesive #7 was used instead of the light diffusing layer 28. The results are shown in Table 2. The transflective polarizers produced in this example showed improved transmission luminance and reflection luminance and improved visibility as compared with Reference Example 2, irrespective of use or no-use of a reflection-type polarizer.

TABLE 2

|  | Inorganic compound | Polymer film | Reflection-type polarizer is not used | | Reflection-type polarizer is used | |
|---|---|---|---|---|---|---|
|  |  |  | Transmission luminance (cd/m²) | Reflection luminance (cd/m²) | Transmission luminance (cd/m²) | Reflection luminance (cd/m²) |
| Reference Example 2 | None | None | 405 | 316 | 504 | 432 |

TABLE 2-continued

|  | Inorganic compound | Polymer film | Reflection-type polarizer is not used | | Reflection-type polarizer is used | |
| --- | --- | --- | --- | --- | --- | --- |
|  |  |  | Transmission luminance (cd/m$^2$) | Reflection luminance (cd/m$^2$) | Transmission luminance (cd/m$^2$) | Reflection luminance (cd/m$^2$) |
| Example 7 | Nb$_2$O$_5$ | HC-TAC | 370 | 476 | 476 | 556 |
| Example 8 | ZnS | HC-TAC | 350 | 550 | 449 | 613 |
| Example 9 | Nb$_2$O$_5$ | AG5-TAC | 444 | 427 | 541 | 470 |
| Example 10 | ZnS | AG5-TAC | 420 | 467 | 511 | 526 |
| Example 11 | Nb$_2$O$_5$ | AG5-TAC | 442 | 441 | 539 | 485 |
| Example 12 | ZnS | AG5-TAC | 439 | 440 | 541 | 489 |

Transflective polarizers were produced using the following films and layers, and applied to a liquid crystal display device. These examples are shown below.

(1) Transflective Film Composed of Polymer Film Having a transflective layer

The transflective films produced in Examples 1 to 6 were used.

(2) Absorption-Type Polarizer

SR1872A: Iodine-based absorption-type polarizer: available from Sumitomo Chemical Co., Ltd.

(3) Reflection-Type Polarizer

DBEF-P: Reflection-type polarizer obtained by laminating two polymer films and utilizing the anisotropy of reflectance by refractive index anisotropy: available from Sumitomo 3M (4) Light Diffusing Layer Light diffusive pressure-sensitive adhesive #B: Acrylate-based pressure-sensitive adhesive containing dispersed fine particles and having a haze of 78%: available from Sumitomo Chemical Co., Ltd.

(5) Pressure-Sensitive Adhesive

Pressure-sensitive adhesive #7: Colorless and transparent acrylate-based pressure-sensitive adhesive: available from Sumitomo Chemical Co., Ltd.

Example 13

Figure 16:
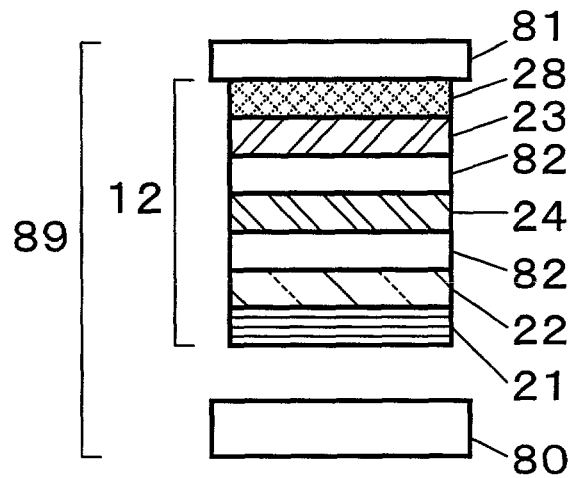
FIG. 16 is a schematic sectional view showing a constitution of a polarizing light source device evaluated in Reference Example 13.
Figure 17:
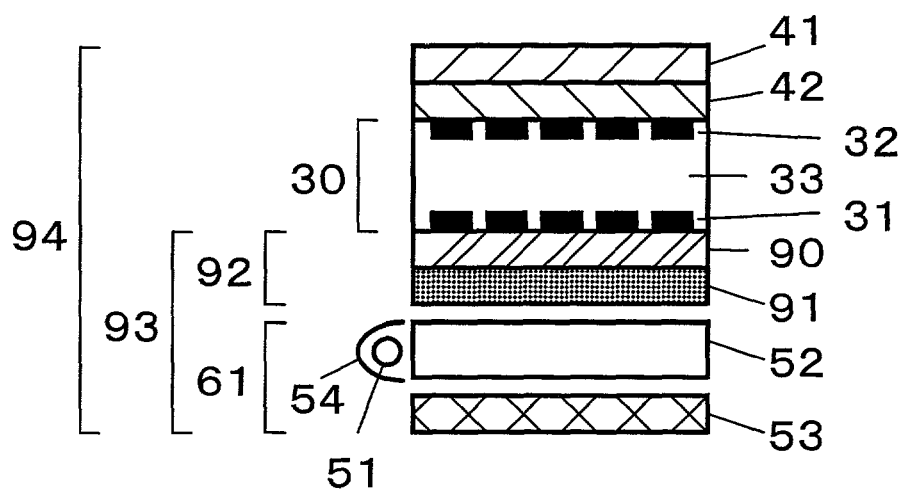
FIG. 17 is a schematic sectional view showing a constitution of a conventional transflective liquid crystal display device.
Figure 18:
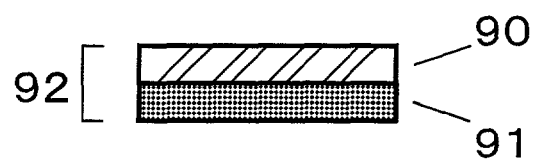
FIG. 18 is a schematic sectional view showing a layer constitution of a conventional transflective polarizer.

As shown in FIG. 16, the pressure-sensitive adhesive 82, reflection-type polarizer 24, pressure-sensitive adhesive 82, absorption-type polarizer 23 and light diffusing layer 28 were closely laminated in this order on the polymer film 22 side of the transflective film composed of polymer film 22 and transflective layer 21 produced in Example 1 instead of the transflective polarizer 11 in Example 7, so that the polarization transmission axis of the reflection-type polarizer 24 and the polarization transmission axis of the absorption-type polarizer 23 were approximately parallel, to produce a transflective polarizer 13. The glass plate 81 having a thickness of 1.1 mm was pasted on the light diffusive pressure-sensitive adhesive #B which is the light diffusing layer 28 of this transflective polarizer 13, and the resulted article was placed on the light source device 80 used in Reference Example 7 so that the glass plate 81 was situated at the upper side, producing a polarizing light source device 89. Using this polarizing light source device 89, the transmission luminance and reflection luminance were measured by the same manner as shown in (D) of Reference Example 2. The results are shown in Table 3. The transflective polarizer produced in this example had a reflection luminance of 450 cd/m$^2$ or more, showing brightness sufficient to illuminate a display screen outside.

Example 14

Evaluation was conducted in the same manner as in Example 13 except that as the transflective film, one produced in Example 2 was used. The results are shown in Table 3. The transflective polarizer produced in this example had a reflection luminance of 550 cd/m$^2$ or more, showing brightness sufficient to illuminate a display screen outside.

Example 15

Evaluation was conducted in the same manner as in Example 13 except that as the transflective film, one produced in Example 3 was used. The results are shown in Table 3. The transflective polarizer produced in this example showed improved transmission luminance and reflection luminance and improved visibility as compared with Reference Example 2.

Example 16

Evaluation was conducted in the same manner as in Example 13 except that as the transflective film, one produced in Example 4 was used. The results are shown in Table 3. The transflective polarizer produced in this example showed improved transmission luminance and reflection luminance and improved visibility as compared with Reference Example 2.

Example 17

Evaluation was conducted in the same manner as in Example 13 except that as the transflective film, one produced in Example 5 was used. The results are shown in Table 3. The transflective polarizer produced in this example showed improved transmission luminance and reflection luminance and improved visibility as compared with Reference Example 2.

Example 18

Evaluation was conducted in the same manner as in Example 13 except that as the transflective film, one produced in Example 6 was used. The results are shown in Table 3. The transflective polarizer produced in this example showed improved transmission luminance and reflection luminance and improved visibility as compared with Reference Example 2.

TABLE 3

|  | Inorganic compound | Polymer film | Transmission luminance (cd/m$^2$) | Reflectance luminance (cd/m$^2$) |
| --- | --- | --- | --- | --- |
| Example 13 | Nb$_2$O$_5$ | HC-TAC | 495 | 518 |
| Example 14 | ZnS | HC-TAC | 475 | 587 |
| Example 15 | Nb$_2$O$_5$ | AG5-TAC | 565 | 446 |
| Example 16 | ZnS | AG5-TAC | 531 | 517 |
| Example 17 | Nb$_2$O$_5$ | AG6-TAC | 562 | 462 |
| Example 18 | ZnS | AG6-TAC | 551 | 484 |

If the transflective film or transflective polarizer of present invention is applied to a polarizing light source device and further if it is applied to a transflective liquid crystal display device, then, for example, in the case of use as reflective mode, a display screen can be made brighter for transmissive mode while maintaining the luminance equivalent to conventional, or, in any of a reflective mode and a transmissive mode, the consumption power of a polarizing light source device in use as transmissive mode can be decreased while maintaining the luminance equivalent to conventional, by this, the consumption time of a battery can be elongated. Further, visibility under solar light can be improved since reflection ability can be simply imparted to a transmissive liquid crystal display device.

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. A transflective film comprising a polymer film having an in-plane phase retardation value of about 30 nm or less and a single transflective layer consisting of at least one layer made of an inorganic compound, not of metal or polymer, wherein the transflective layer is coated on the polymer film in a continuous layer, the transflective layer has an utilization efficiency of light from about 80% to about 100%, a refractive index of the inorganic compound is about 1.9 or more and a reflectance of the transflective film is from about 10% to about 95%, and
wherein when the transflective layer is a single layer structure, the optical thickness of the transflective layer is one-fourth of the specific wavelength in the visible region, and
when the transflective layer is a multi layer structure, the optical thickness of at least one layer composing the transflective layer is one-fourth of the specific wavelength in the visible region.

2. The transflective film according to claim 1, wherein a rough surface is formed on at least one surface of the polymer film and the transflective layer is coated on this rough surface.

3. A transflective polarizer comprising the transflective film according to claim 1 and an absorption-type polarizer laminated on the transflective film.

4. The transflective polarizer according to claim 3, wherein a reflection-type polarizer is further laminated on the opposite side to the absorption-type polarizer so that the reflection-type polarizer faces the transflective film.

5. A transflective polarizer comprising a polymer film having one surface on which a single transflective layer consisting of at least one layer made of an inorganic compound, not of metal or polymer, is formed in a continuous layer, a reflection-type polarizer and an absorption-type polarizer, wherein the polymer film, the reflection-type polarizer and the absorption-type polarizer are laminated in this order, wherein the transflective layer has an utilization efficiency of light from about 80% to about 100%, and a refractive index of the inorganic compound is about 1.9 or more, and
wherein when the transflective layer is a single layer structure, the optical thickness of the transflective layer is one-fourth of the specific wavelength in the visible region, and
when the transflective layer is a multi layer structure, the optical thickness of at least one layer composing the transflective layer is one-fourth of the specific wavelength in the visible region.

6. A transflective polarizer comprising a polymer film formed in an irregular shape on at least one surface thereof and a single transflective layer consisting of at least one layer made of an inorganic compound, not of metal or polymer, on the irregular shape in a continuous layer, a reflection-type polarizer and an absorption-type polarizer, wherein the polymer film, the reflection-type polarizer and the absorption-type polarizer are laminated in this order, wherein the transflective layer has an utilization efficiency of light from about 80% to about 100%, and a refractive index of the inorganic compound is about 1.9 or more, and
wherein when the transflective layer is a single layer structure, the optical thickness of the transflective layer is one-fourth of the specific wavelength in the visible region, and
when the transflective layer is a multi layer structure, the optical thickness of at least one layer composing the transflective layer is one-fourth of the specific wavelength in the visible region.

7. The transflective polarizer according to any of claims 3 to 6, additionally comprising at least one light diffusing layer.

8. The transflective polarizer according to claim 7, wherein the light diffusing layer has an in-plane phase retardation value of about 30 nm or less.

9. The transflective polarizer according to claim 8, wherein the light diffusing layer has an adhesive property.

10. The transflective polarizer according to claim 8, wherein at least two adjacent films or layers are closely laminated with a pressure-sensitive adhesive.

11. The transflective polarizer according to claim 7, wherein the light diffusing layer has an adhesive property.

12. The transflective polarizer according to claim 11, wherein at least two adjacent films or layers are closely laminated with a pressure-sensitive adhesive.

13. The transflective polarizer according to claim 7, wherein at least two adjacent films or layers are closely laminated with a pressure-sensitive adhesive.

14. A polarizing light source device comprising the transflective polarizer according to any of claims 3 to 6 and a light source member and a reflector, wherein the light source member and reflector are placed in this order on the polymer film side of the transflective polarizer.

15. A transflective liquid crystal display device comprising the polarizing light source device according to claim 14, a liquid crystal cell and an absorption-type polarizer placed at a front side of a liquid crystal cell, wherein the liquid crystal cell and the absorption-type polarizer are placed in this order on the transflective polarizer side of the polarizing light source device.

16. The transflective liquid crystal display device according to claim 15, wherein a light diffusing layer is laminated between the liquid crystal cell and the absorption-type polarizer.

17. The transflective liquid crystal display device according to claim 16, wherein at least one pair of members from the transflective polarizer to the absorption-type polarizer are closely laminated with a pressure-sensitive adhesive.

18. The transflective liquid crystal display device according to claim 15, wherein at least one pair of members from the transflective polarizer to the absorption-type polarizer are closely laminated with a pressure-sensitive adhesive.

* * * * *